(12) United States Patent
Linden

(10) Patent No.: US 6,186,601 B1
(45) Date of Patent: Feb. 13, 2001

(54) VEHICLE BRAKE SYSTEM OF A MOTOR VEHICLE

(75) Inventor: Christoph Linden, Vallendar (DE)

(73) Assignee: Lucas Industries public limited company (GB)

(*) Notice: Under 35 U.S.C. 154(b), the term of this patent shall be extended for 0 days.

(21) Appl. No.: 09/540,275

(22) Filed: Mar. 31, 2000

Related U.S. Application Data

(63) Continuation of application No. PCT/EP98/06222, filed on Sep. 30, 1998.

(30) Foreign Application Priority Data

Oct. 6, 1997 (DE) .............................................. 197 44 112

(51) Int. Cl.$^7$ ....................................................... B60T 8/34
(52) U.S. Cl. ...................... 303/113.1; 303/20; 303/114.3
(58) Field of Search ............................. 303/113.1, 113.2, 303/113.3, 114.3, 113.4, 3, 10, 20, 115.3, 125, 155, 135, 166, 176, DIG. 3, DIG. 4; 188/356, 357, 156, 158; 701/71, 74, 75

(56) References Cited

U.S. PATENT DOCUMENTS

| | | |
|---|---|---|
| 3,871,497 | 3/1975 | Bessiere . |
| 5,342,120 | 8/1994 | Zimmer et al. . |
| 5,350,225 * | 9/1994 | Steiner et al. ..................... 303/113.4 |
| 5,372,409 * | 12/1994 | Farr ......................................... 303/20 |
| 5,855,420 * | 1/1999 | Lawerence .......................... 303/113.4 |
| 5,918,948 | 7/1999 | Burgdorf et al. . |
| 5,924,508 | 7/1999 | Clauss et al. . |
| 5,971,500 * | 10/1999 | Voges et al. ....................... 303/113.4 |
| 6,033,039 * | 3/2000 | Dieringer ........................... 303/114.3 |

FOREIGN PATENT DOCUMENTS

| | | |
|---|---|---|
| 40 37 468 A1 | 5/1992 | (DE) . |
| 43 24 205 A1 | 1/1995 | (DE) . |
| 44 25 578 A1 | 1/1996 | (DE) . |
| 44 27 247 A1 | 2/1996 | (DE) . |
| 195 03 622 A1 | 8/1996 | (DE) . |
| 195 47 111 A1 | 6/1997 | (DE) . |
| 0 588 193 A1 | 9/1993 | (EP) . |
| 0 819 591 A1 | 7/1997 | (EP) . |
| WO 96/14228 | 5/1996 | (WO) . |
| WO 98/43857 | 10/1998 | (WO) . |

OTHER PUBLICATIONS

XP 000635432 Research Disclosure—Aug. 1996 Adjustable Dead–Stroke in Braking System Disclosed by Philippe Castel.

* cited by examiner

*Primary Examiner*—Christopher P. Schwartz
*Assistant Examiner*—Melanie Talavera
(74) *Attorney, Agent, or Firm*—MacMillan, Sobanski & Todd, LLC

(57) ABSTRACT

The invention relates to a vehicle brake system of a motor vehicle, with an electronically controllable brake booster, comprising a vacuum chamber and a pressure chamber which are separated from each other by a movable wall, a control valve arrangement which can be actuated by an electro-magnetic actuator, wherein a pressure difference between the pressure chamber and the vacuum chamber is adjustable, with the movable wall changing its position as a function of the pressure conditions in the vacuum chamber and in the pressure chamber, thereby actuating a master cylinder, with the electromagnetic being supplied with current signals by an electronic control unit during operation, which the electronic control unit generates as a function of driving dynamics conditions or external influences, characterised in that upon the presence of certain driving dynamics conditions or external influences, or combinations thereof which render the actuation of the master cylinder necessary with a predetermined probability within a predetermined time interval, the electronic control unit generates control signals for the electromagnetic actuation means, so that the control valve arrangement is actuated to such a degree that play, backlash, or tolerance-related free travel in at least part of the vehicle brake system is overcome.

16 Claims, 1 Drawing Sheet

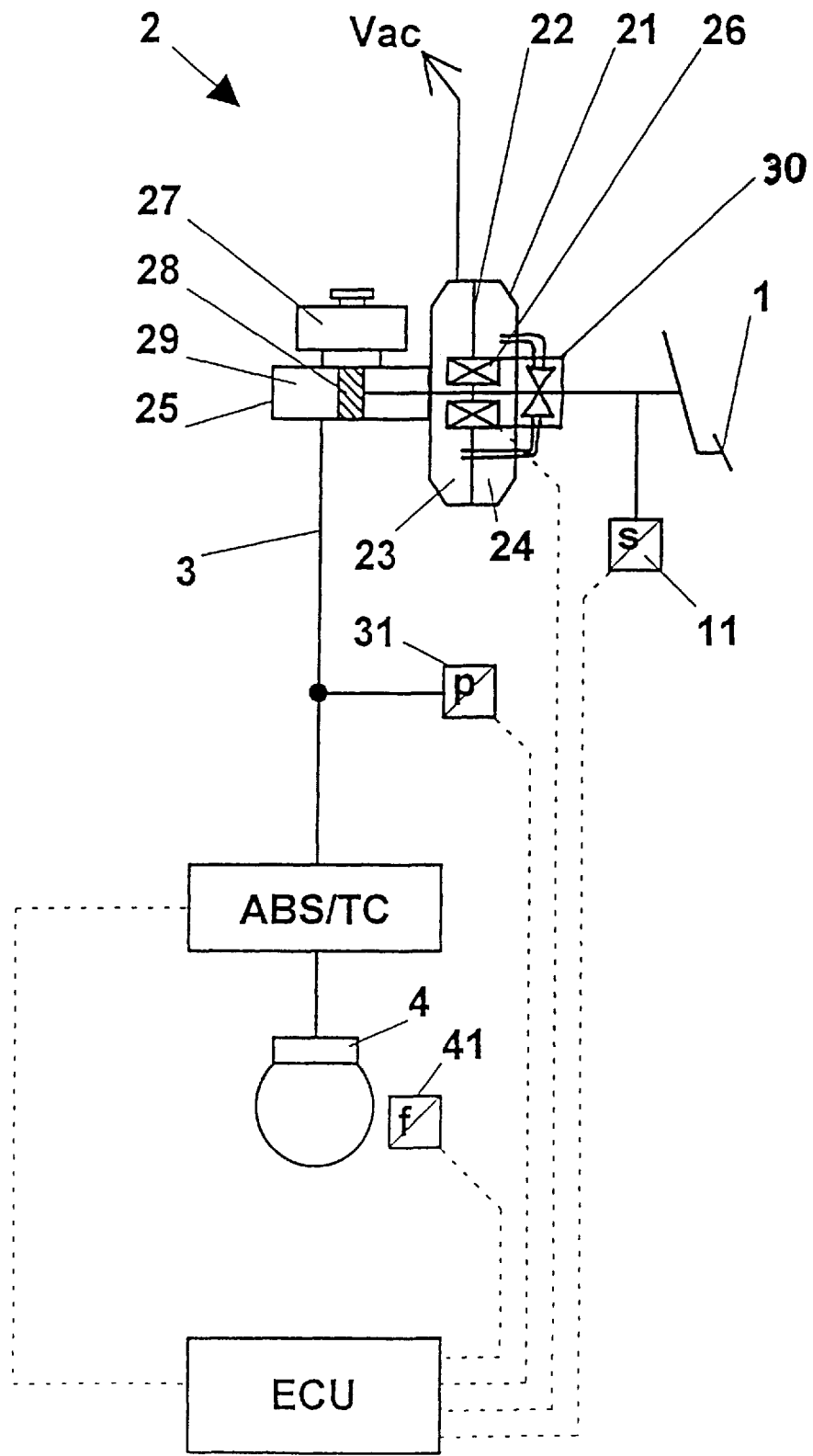

VEHICLE BRAKE SYSTEM OF A MOTOR VEHICLE

CROSS REFERENCE TO RELATED APPLICATIONS

This application is a continuation of International Application No. PCT/EP98/06222 filed Sept. 30, 1998, which claims priority to German Patent Application No. 197 44 112.2 filed Oct. 6, 1997.

BACKGROUND OF THE INVENTION

The present invention relates to a vehicle brake system of a motor vehicle.

In particular, the present invention relates to a vehicle brake system of a motor vehicle with an electronically controllable brake booster comprising a vacuum chamber and a pressure chamber which are separated from each other by a movable wall, a control valve arrangement which can be actuated by means of an electromagnetic actuation means and by means of which a pressure difference between the pressure chamber and the vacuum chamber is adjustable, with the movable wall changing its position as a function of the pressure conditions in the vacuum chamber and in the pressure chamber, thereby actuating a master cylinder, with the electromagnetic actuation means being supplied with current signals by an electronic control unit during operation, which the electronic control unit generates as a function of driving dynamics conditions or external influences.

Such a vehicle brake system is known, for example, from DE 43 24 205 A1.

Such vehicles brake systems are employed for motor vehicles which are equipped with vehicle-to-vehicle ranging controls and cruise controls, or with combinations of these two controls (AbstandsRegelTempomaten—automatic ranging/cruise controls). One of the problems of these systems, however, is that these controls are relatively unreliable, because for a rapid control there exists too much play, backlash, or tolerance-related free travel in the vehicle brake system.

The consequence of this is that braking distance is "given away". At a vehicle speed of 200 km/h and a vehicle brake system-related lost time of only 200 ms, this "given away" braking distance amounts to 11 m! Compared to a braking distance of approx. 193 m (at a deceleration of 8 m/s$^2$) this corresponds to approx. 6%. Moreover, the control can exhibit an unsuitable transient behaviour or an overshooting behaviour as well.

SUMMARY OF THE INVENTION

The invention considers or utilises, respectively, the friction of seals and moved components and their bearings as counterforce or as holding force, respectively. It is thereby achieved that the components moved into a play-free position by the actuated control valve arrangement are held in this position as well, so that upon a braking operation to be initiated this position can already be the starting position.

According to a preferred embodiment of the invention the vehicle brake system is further developed in that, for sensing driving dynamics conditions or external influences, or combinations thereof, the electronic control unit is connected with sensors which sense the vehicle speed, and/or the vehicle acceleration/deceleration, and/or the distance from another vehicle, and/or the shift condition of the automatic speed control (cruise control), and/or the position of the throttle, and/or the position of the gearshift lever or of the automatic transmission, and/or the fuel consumption, and/or the brightness of the environment, and/or the time of day, and/or the contact of the brake pedal by the driver, and/or other signals which are relevant for the assessment of the probability of a braking operation required in the immediate future.

On the basis of this information from these sensors, the electronic control unit can determine whether the initiation of a braking operation in the immediate future is probable.

In a first design stage, the current signals generated by the electronic control unit are dimensioned in such a manner that they control the electromagnetic actuation means to such an extent, that play, backlash, or tolerance-related free travel in the brake booster are overcome without an actuation of the master cylinder taking place.

In a second, further design stage, the current signals generated by the electronic control unit are dimensioned in such a manner that they control the electromagnetic actuation means to such an extent, that play, backlash, or tolerance-related free travel in the master cylinder are overcome without an actuation of the brake means at the wheels of the vehicle taking place.

In a further design stage, the current signals generated by the electronic control unit are dimensioned in such a manner that they control the electromagnetic actuation means to such an extent, that play, backlash, or tolerance-related free travel in the brake lines, valve arrangements, and brake means at the wheels of the vehicle are overcome without an actuation of the brake means taking place.

Preferably, the overcoming of play, backlash, or tolerance-related free travel in the brake booster, and/or the master cylinder, and/or the brake lines, valve arrangement, and brake means at the wheels of the vehicle is sensed by corresponding sensors which generate feedback signals for the electronic control unit.

The electronic control unit comprises a computer for combining the signals sensed by the sensors in accordance with predetermined rules, and a memory for storing the predetermined rules as well as empirical values obtained during the operation of the vehicle brake system. These are used for the detection of driver-specific behavioural patterns before a braking operation and for their evaluation for future braking situations.

In an embodiment of the invention, the empirical values stored in the memory are combinations of sensed sensor signals as well as of probability values by means of which upon the respective combination of sensed sensor signals being present, a braking operation was carried out within a time interval in the past.

In this manner, the current signals generated by the electronic control unit can control the electromagnetic actuation means as a function of present sensor signals compared with the empirical values stored in the memory to such an extent that with increasing probability of a braking operation to be initiated in the immediate future, play, backlash, or tolerance-related free travel is overcome at first in the brake booster, then in the master cylinder, and then in the brake lines, valve arrangements and brake means at the wheels of the vehicle, without an actuation of the brake means taking place.

In this stepwise overcoming of the free travel, the vehicle brake system can be prepared successively for a braking operation as a function of external influences, so that in the very moment in which the braking operation is actually intended by the driver through an actuation of the brake pedal, the brake can immediately "grip" without the occurrence of delays related to the vehicle brake system.

Further properties, advantages, characteristics and variation possibilities of the invention will be explained by means of the following description of a currently preferred embodiment of the invention with reference to the drawing.

BRIEF DESCRIPTION OF THE DRAWINGS

The FIGURE is a schematic diagram of a vehicle brake system for a motor vehicle, in accordance with the present invention.

DETAILED DESCRIPTION OF THE INVENTION

The FIGURE shows a vehicle brake system in which a brake pedal 1 serves to actuate a brake pressure generator unit 2 via an actuation element. The brake pressure generator unit 2 comprises a brake cylinder 25 in which a piston 28 forms a pressure chamber 29. The pressure chamber 29 is supplied with brake fluid from a reservoir 27. A brake line 3 leads from the pressure chamber 29 to a wheel brake 4 of the vehicle.

An anti-blocking control means and/or a traction control means ABS/TC are arranged in the brake line 3 between the brake pressure generator unit 2 and the wheel brake 4. The anti-blocking and/or traction control means ABS/TC comprises i.a. valve and pump arrangements in a known manner which can be driven by an electronic control unit ECU in order to modulate the pressure in the wheel brake. This occurs as a function of the rotational behaviour of a vehicle wheel associated with the wheel brake 4, which is sensed by means of a sensor 41 and supplied to the electronic control unit ECU.

The brake pressure generator unit comprises a brake booster 21 for the amplification of the actuation force which is introduced by the driver via the brake pedal 1. A movable wall 22 divides the brake booster 21 into a vacuum chamber 23 and a pressure chamber 24. For the generation of the vacuum, the vacuum chamber 23 is connected to a vacuum source Vac which is not shown in detail. In a vehicle which is equipped with an Otto engine, the vacuum which is inherently produced in the intake tube, is available. However, in a vehicle which is powered by a Diesel engine or an electric motor, an additional vacuum pump is required as the vacuum source Vac. Upon an actuation of the brake pedal 1, the brake booster functions in a known manner in that the pressure chamber 24 is subjected to atmospheric pressure so that a pressure difference is acting on the movable wall 22, which assists the actuation force introduced at the brake pedal 1. In the non-actuated condition the vacuum chamber 23 and the pressure chamber 24 are connected with each other and thus pressure compensated so that no pressure difference is effective at the movable wall 22.

The brake booster 21 is also electronically controllable via a control valve arrangement 30 which can be actuated by a solenoid arrangement 26. The electronic controllability of the brake booster 21 makes it possible to carry out braking operations also automatically, i.e. independent of an actuation of the brake pedal 1. Thereby a pressure difference between the pressure and the vacuum chamber can be adjusted, with the movable wall changing its position as a function of the pressure conditions in the vacuum chamber and in the pressure chamber, and thereby actuating the brake cylinder.

This can be utilised for the realisation of a traction control, driving dynamics control, or vehicle-to-vehicle ranging control. A sensor means 11 is provided in order to sense parameters which are related to the actuation of the brake pedal 1, such as, for example, pedal travel, pedal force, or pedal actuation speed for the evaluation in the electronic control unit ECU, in order to also carry out braking operation in emergency situations, wherein, for example, exceeding a certain pedal actuation speed serves as the criterion.

Further sensors which are connected with the electronic control unit also serve to sense the driving dynamics conditions or external influences on the vehicle or the vehicle brake system, respectively. These are, in particular, sensors which sense the vehicle speed, the vehicle acceleration/deceleration/, the distance from the previous of following vehicle, the shift condition of the automatic speed control (cruise control), and/or the position of the throttle, the position of the gearshift lever or of the automatic transmission, the fuel consumption, the brightness of the environment, the time of day, the temperature at various places of the vehicle brake system, or other signals which are relevant for the assessment of the probability of a braking operation required in the immediate future.

Upon the presence of certain driving dynamics conditions or external influences on the vehicle brake system, or combinations thereof which render the actuation of the master cylinder necessary with a predetermined probability within a predetermined time interval, the electronic control unit generates control signals for the electromagnetic actuation means, so that the control valve arrangement is actuated to such a degree that play, backlash, or tolerance-related free travel is overcome in at least part of the vehicle brake system, without an actuation of the master cylinder or further downstream components in the vehicle brake system (brake lines, valve arrangements, brake means at the wheels of the vehicle, etc.) taking place.

The electronic control unit comprises a computer for combining the signals sensed by the sensors in accordance with predetermined rules, and a memory for storing the predetermined rules as well as empirical values obtained during the operation of the vehicle brake system.

The empirical data stored in the memory are combinations of sensed sensor signals as well as of probability values, by means of which with the respective combination of sensed sensor signals being present a braking operation was carried out during a time interval in the past. These empirical values can be specific for the respective vehicle so that the driver's behaviour is incorporated. It is, however, also possible to store general empirical values (introduced at the manufacturing site) with the respective vehicle type.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle brake system of a motor vehicle, wherein brake means at its wheels can be subjected to pressure via a master cylinder, with an electronically controllable brake booster, comprising
   a vacuum chamber and a pressure chamber which are separated from each other by a movable wall,
   a control valve arrangement which can be actuated by means of an electromagnetic actuation means and by means of which a pressure difference between the pressure chamber and the vacuum chamber is adjustable, with the movable wall changing its position as a function of the pressure conditions in the vacuum chamber and in the pressure chamber, thereby actuating a master cylinder, with the electromagnetic actuation means being supplied with current signals by an electronic control unit during operation, which the electronic control unit generates as a function of driving dynamics conditions or external influences, which are sensed by sensors connected with the electric control unit, and upon the presence of certain driving dynamics conditions or external influences, or combinations thereof which render the actuation of the master cylinder necessary with a predetermined probability within a predetermined time interval, the electronic control unit generates control signals for the electromagnetic actuation means, so that the control valve arrangement is actuated to such a degree that at least one of play, backlash, and tolerance-related free travel in at least the brake booster is overcome, characterised in that no actuation of the brake means takes place, the electronic control unit comprises a computer for combining the signals sensed by the sensors in accordance with predetermined rules, and a memory for storing the predetermined rules as well as empirical values obtained during the operation of the vehicle brake system, and the empirical values stored in the memory are combinations of sensed sensor signals as well as of probability values by means of which upon the respective combination of sensed sensor signals being present, a braking operation was carried out within a time interval in the past.

2. The vehicle brake system according to claim 1, characterised in that the electronic control unit is connected with sensors for sensing at least one of the driving dynamics conditions and external influences or combinations thereof, which sense signals which are relevant for the assessment of the probability of a braking operation required in the immediate future.

3. The vehicle brake system according to claim 1, characterised in that the current signals generated by the electronic control unit control the electromagnetic actuation means to such an extent, that at least one of play, backlash, and tolerance-related free travel in the master cylinder as well are overcome.

4. The vehicle brake system according to claim 1, characterised in that the current signals generated by the electronic control unit control the electromagnetic actuation means to such an extent, that at least one of play, backlash, and tolerance-related free travel in the brake lines, valve arrangements, and brake means at the wheels of the vehicle as well are overcome without an actuation of the brake means taking place.

5. The vehicle brake system according to claim 1, characterised in that the overcoming of at least one of play, backlash, and tolerance-related free travel in at least one of the brake booster, the master cylinder, and the brake lines, valve arrangement, and brake means at the wheels of the vehicle is sensed by sensors which generate feedback signals for the electronic control unit.

6. The vehicle brake system according to claim 1, characterised in that the current signals generated by the electronic control unit control the electromagnetic actuation means as a function of present sensor signals compared with the empirical values stored in the memory to such an extent, that with increasing probability of a braking operation to be initiated in the immediate future, at least one of play, backlash, and tolerance-related free travel is overcome at first in the brake booster, then in the master cylinder, and then in the brake lines, valve arrangements and brake means at the wheels of the vehicle, without an actuation of the brake means taking place.

7. The vehicle brake system according to claim 2, characterised in that the sensors sense the vehicle speed which is relevant for the assessment of the probability of a braking operation.

8. The vehicle brake system according to claim 2, characterised in that the sensors sense one of the vehicle acceleration and deceleration which is relevant for the assessment of the probability of a braking operation.

9. The vehicle brake system according to claim 2, characterised in that the sensors sense the distance from another vehicle which is relevant for the assessment of the probability of a braking operation.

10. The vehicle brake system according to claim 2, characterised in that the sensors sense the shift condition of the automatic speed control which is relevant for the assessment of the probability of a braking operation.

11. The vehicle brake system according to claim 2, characterised in that the sensors sense the position of the throttle which is relevant for the assessment of the probability of a braking operation.

12. The vehicle brake system according to claim 2, characterised in that the sensors sense one of the position of the gearshift lever and of the automatic transmission which is relevant for the assessment of the probability of a braking operation.

13. The vehicle brake system according to claim 2, characterised in that the sensors sense the fuel consumption which is relevant for the assessment of the probability of a braking operation.

14. The vehicle brake system according to claim 2, characterised in that the sensors sense the brightness of the environment which is relevant for the assessment of the probability of a braking operation.

15. The vehicle brake system according to claim 2, characterised in that the sensors sense the time of day which is relevant for the assessment of the probability of a braking operation.

16. The vehicle brake system according to claim 2, characterised in that the sensors sense the contact of the brake pedal by the driver which is relevant for the assessment of the probability of a braking operation.

* * * * *